United States Patent
Pyle

(10) Patent No.: US 11,178,126 B2
(45) Date of Patent: Nov. 16, 2021

(54) SYSTEMS AND METHODS FOR SECURELY ACCESSING PROGRAMMABLE DEVICES

(71) Applicant: SCHNEIDER ELECTRIC USA, INC., Palatine, IL (US)

(72) Inventor: Michael Pyle, Hermitage, TN (US)

(73) Assignee: SCHNEIDER ELECTRIC USA, INC., Palatine, IL (US)

(*) Notice: Subject to any disclaimer, the term of this patent is extended or adjusted under 35 U.S.C. 154(b) by 360 days.

(21) Appl. No.: 14/761,139

(22) PCT Filed: Jan. 15, 2013

(86) PCT No.: PCT/US2013/021553
§ 371 (c)(1),
(2) Date: Jul. 15, 2015

(87) PCT Pub. No.: WO2014/112972
PCT Pub. Date: Jul. 24, 2014

(65) Prior Publication Data
US 2015/0350182 A1    Dec. 3, 2015

(51) Int. Cl.
*G06F 7/04* (2006.01)
*H04L 29/06* (2006.01)
(Continued)

(52) U.S. Cl.
CPC .............. *H04L 63/08* (2013.01); *G06F 21/45* (2013.01); *H04L 63/083* (2013.01);
(Continued)

(58) Field of Classification Search
CPC . H04L 63/083; H04L 67/146; H04L 63/0884; H04L 63/08; H04L 9/0819;
(Continued)

(56) References Cited

U.S. PATENT DOCUMENTS 6,691,232 B1     2/2004   Wood et al.
8,302,187 B1 *  10/2012   Gupta ................. H04L 65/1079
                                                       713/182
(Continued)

FOREIGN PATENT DOCUMENTS

CN        102629928 A       8/2012

OTHER PUBLICATIONS

Manz et al, A Hybrid Authentication and Authorization Process for Control System Networks, IEEE, Aug. 25, 2010, pp. 36-39. (Year: 2010).*

(Continued)

*Primary Examiner* — Luu T Pham
*Assistant Examiner* — Jenisee E Jackson
(74) *Attorney, Agent, or Firm* — Lando & Anastasi, LLP

(57) ABSTRACT

According to various aspects and embodiments, a system including a programmable device is provided. The programmable device includes a memory storing an identifier of an authentication session and at least one processor coupled to the memory. The at least one processor is configured to receive an authentication credential, decode the authentication credential to access a session identifier and information associated with a requestor of the authentication credential, determine whether the session identifier matches the identifier of the authentication session, and grant the requestor access to protected functionality of the programmable device if the session identifier matches the identifier of the authentication session.

19 Claims, 8 Drawing Sheets

(51) Int. Cl.
  *G06F 21/45* (2013.01)
  *H04L 29/14* (2006.01)
  *H04L 29/08* (2006.01)
(52) U.S. Cl.
  CPC .......... *H04L 63/0884* (2013.01); *H04L 69/40* (2013.01); *H04L 67/146* (2013.01)
(58) Field of Classification Search
  CPC ....... H04L 9/0825; H04L 69/40; G06F 21/44; G06F 21/45; G06F 21/31; G06F 21/62
  USPC .......................................................... 726/7
  See application file for complete search history.

(56) References Cited

U.S. PATENT DOCUMENTS

| | | | | |
|---|---|---|---|---|
| 8,850,219 | B2* | 9/2014 | Dapkus | G06F 21/577 713/185 |
| 2003/0102493 | A1 | 6/2003 | Wuidart et al. | |
| 2003/0105725 | A1* | 6/2003 | Hoffman | G06F 21/32 705/75 |
| 2005/0188222 | A1* | 8/2005 | Motsinger | G06F 21/316 726/5 |
| 2005/0188423 | A1* | 8/2005 | Motsinger | H04L 63/0876 726/22 |
| 2008/0022377 | A1* | 1/2008 | Chen | H04L 63/062 726/5 |
| 2008/0163361 | A1 | 7/2008 | Davis et al. | |
| 2008/0219186 | A1* | 9/2008 | Bell | H04L 12/4625 370/254 |
| 2008/0293377 | A1* | 11/2008 | Pauliac | H04W 8/20 455/411 |
| 2009/0019118 | A1* | 1/2009 | Jones | G06Q 10/107 709/206 |
| 2009/0125992 | A1* | 5/2009 | Larsson | H04L 67/146 726/6 |
| 2009/0307133 | A1* | 12/2009 | Holloway | G06Q 20/04 705/44 |
| 2009/0320107 | A1 | 12/2009 | Corella | |
| 2011/0264913 | A1* | 10/2011 | Nikander | H04L 63/0815 713/168 |
| 2011/0299125 | A1* | 12/2011 | King | H04N 1/00244 358/1.15 |
| 2012/0268768 | A1* | 10/2012 | Nakashima | G06F 21/608 358/1.13 |
| 2013/0061298 | A1* | 3/2013 | Longobardi | G06F 21/42 726/6 |
| 2013/0091290 | A1* | 4/2013 | Hirokawa | H04N 7/15 709/227 |
| 2014/0122888 | A1* | 5/2014 | Yoon | H04L 9/0844 713/171 |
| 2014/0351594 | A1* | 11/2014 | Soulios | H04L 9/3213 713/168 |
| 2015/0113279 | A1* | 4/2015 | Andersen | H04L 63/0457 713/171 |
| 2015/0161410 | A1* | 6/2015 | Andersen | H04L 63/0457 713/165 |

OTHER PUBLICATIONS

Hussain et al, Process Authentication for High System Assurance, IEEE, Jul. 16, 2013, vol. 11, No. 2, pp. 168-180. (Year: 2013).*
Extended European Search Report from corresponding European Application No. 13872215.2 dated Jun. 28, 2016.
Notification of Transmittal of the International Search Report and the Written Opinion of the International Searching Authority from corresponding PCT/US2013/021553 dated Mar. 22, 2013.

* cited by examiner

SYSTEMS AND METHODS FOR SECURELY ACCESSING PROGRAMMABLE DEVICES

RELATED APPLICATION

This application is a U.S. National Stage Application under 35 U.S.C. § 371 of International Application No. PCT/US2013/021553, filed Jan. 15, 2013, which is hereby incorporated herein by reference in its entirety.

BACKGROUND

Technical Field

The technical field relates generally to protecting programmable devices from unauthorized access and, more particularly, to systems and methods for securely generating user authentication credentials.

Background Discussion

There are at least three conventional techniques for re-establishing access to a device for a user of the device who forgets or loses their authentication credentials. One approach is to send the device back to the factory where the device is returned to factory default settings. A second approach is to provide a user interface element that, when actuated, causes the device to reset authentication credentials to a known standard or causes the device to revert to its factory default settings. A third option is to provide a "backdoor password" that is either hard coded or generated from device specific data such as a serial number of the device. Each of these options provides users access to their devices when the user is unable to authenticate to the device via established authentication credentials.

SUMMARY

According to various aspects and embodiments, a system including a programmable device is provided. The programmable device includes a memory storing an identifier of an authentication session and at least one processor coupled to the memory. The at least one processor is configured to receive an authentication credential, decode the authentication credential to access a session identifier and information associated with a requestor of the authentication credential, determine whether the session identifier matches the identifier of the authentication session, and grant the requestor access to protected functionality of the programmable device if the session identifier matches the identifier of the authentication session.

In the system, the at least one processor may be configured to determine that the session identifier matches the identifier of the authentication session if the session identifier equals the identifier of the authentication session. The at least one processor may be configured to decode the authentication credential by decrypting the authentication credential using a public key. The at least one processor may be further configured to receive a session request, generate the identifier of the authentication session in response to receiving the session request, provide the identifier of the authentication session to the requestor, and initiate a timer in response to providing the identifier of the authentication session to the requestor.

In the system, the at least one processor may be further configured to determine whether a predetermined period of time has expired since the timer was initiated and terminate the authentication session if the predetermined period of time has expired. The at least one processor may be further configured to limit subsequent generation of identifiers of authentication sessions if the predetermined period of time has expired.

In the system, the at least one processor may be further configured to deny the requestor access to the protected functionality of the programmable device if the session identifier does not match the identifier of the authentication session. The at least one processor may be further configured to record an access failure event if the session identifier does not match the identifier of the authentication session, calculate whether a total number of access failure events exceeds a predetermined threshold, and terminate the authentication session if the total number of access failure events exceeds the predetermined threshold. The at least one processor may be further configured to limit subsequent generation of identifiers of authentication sessions if the total number of access failure events exceeds the predetermined threshold.

The system may further include a computer system configured to receive a credential request including the identifier of the authentication session and information identifying a destination, generate an authentication credential in response to receiving the credential request, and provide the authentication credential to the destination. The computer system may be configured to generate the authentication credential based on a combination of the identifier of the authentication session, a unique identifier of the requestor, and additional characters. The computer system may be configured to generate the authentication credential by encrypting the combination. The computer system may be configured to generate the authentication credential by configuring the length of the combination to generate an authentication credential having a length not to exceed 48 characters.

In the system, the programmable device may further comprise a utility meter that includes a sensor configured to measure utility usage and the protected functionality may include functionality to configure operational parameters of the utility meter.

According to another embodiment, a computer system including a memory and at least one processor coupled to the memory is provided. The at least one processor is configured to receive a credential request including an identifier of the authentication session and information identifying a destination, generate an authentication credential in response to receiving the credential request, and provide the authentication credential to the destination.

In the computer system, the at least one processor may be configured to generate the authentication credential based on a combination of the identifier of the authentication session, a unique identifier of a requestor, and additional characters. The at least one processor may be configured to generate the authentication credential by encrypting the combination. The at least one processor may be configured to generate the authentication credential by configuring the length of the combination to generate an authentication credential having a length not to exceed 48 characters.

According to another embodiment, a method of generating authentication credentials using a programmable device and a computer system is provided. The method includes acts of receiving an authentication credential at a programmable device; decoding, by the programmable device, the authentication credential to access a session identifier and information associated with a requestor of the authentication credential; determining whether the session identifier matches the identifier of the authentication session; and granting the requestor access to protected functionality of the programmable device if the session identifier matches the identifier of the authentication session.

The method may further include acts of receiving a credential request including the identifier of the authentication session and information identifying a destination, generating an authentication credential in response to receiving the credential request, and provide the authentication credential to the destination.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
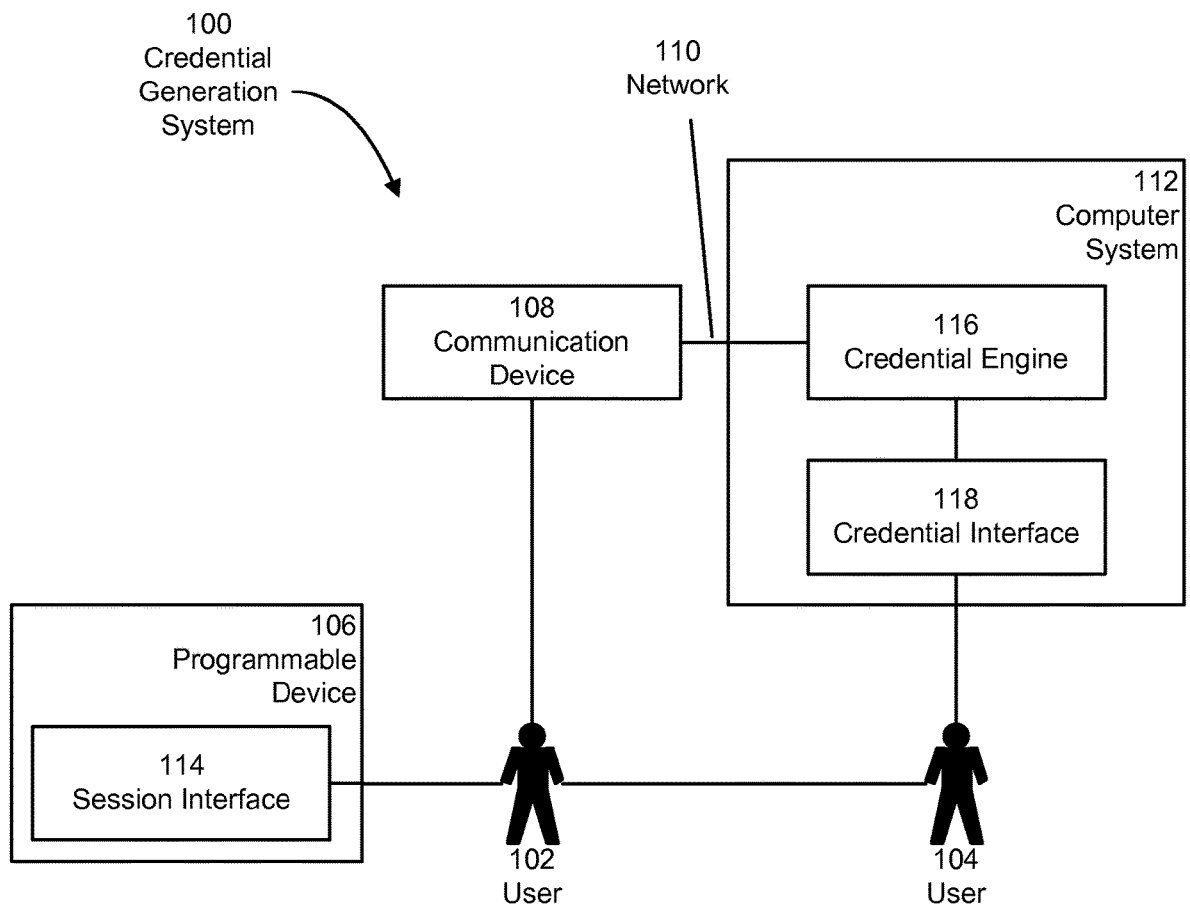
FIG. 1 is a block diagram including an example system for generating authentication credentials.

Some embodiments disclosed herein include apparatus and processes for authenticating users using encoded authentication credentials having a limited duration of efficacy. For example, according to one embodiment, a programmable device is configured to provide an interface through which the programmable device receives requests for an authentication session. In response to receipt of the request, the programmable device provides an identifier of the authentication session to the requestor.

This embodiment further includes a computer system that executes a credential interface that is configured to receive requests to generate authentication credentials. These requests may include the session identifier and return information identifying one or more destinations to which a generated authentication credential is requested to be transmitted. These destinations may include any electronically addressable component, such as a computer system, programmable device, email account, telephone, and the like. According to this embodiment, a credential engine is configured to encode the session identifier and information associated with the requestor into an authentication credential using a predetermined encoding process and to transmit the authentication credential to a destination identified by the return information.

Also, in this embodiment, the programmable device is further configured to provide an interface through which the programmable device receives authentication credentials for processing. Responsive to receipt of an authentication credential, the programmable device decodes the authentication credential, verifies that the authentication credential includes an active session identifier, and, if so, grants access to the requestor of the session.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Credential Generation System

Various embodiments utilize one or more programmable devices and computer systems to securely provide access to the one or more programmable devices. FIG. 1 illustrates one of these embodiments, a credential generation system 100. As shown, FIG. 1 includes two users 102 and 104, a programmable device 106, a communication device 108, a communication network 110, a computer system 112. The programmable device 106 may include any device with configurable operations, such as the programmable device described below with reference to FIG. 3. The communication device 108 may include a mobile computing device such as a laptop computer, tablet computer, cellular phone (e.g., smart phone), personal digital assistant, or any other portable device configured to telecommunicate with other devices. The computer system 112 may include one or more computer systems, such as the computer system described below with reference to FIG. 4.

As depicted in FIG. 1, the computer system 112 and the communication device 108 exchange (i.e. send or receive) information via the network 110. The network 110 may include any communication network through which devices may exchange information. For example, the network 110 may be a public network, such as the internet, and may include other public or private networks such as LANs, WANs, extranets, intranets, and cloud computing systems. The network 110 may also include cellular networks such as CMDA, EvDO, GSM, and iDEN networks.

In at least one example, the user 102 is unable to access protected functionality provided by the programmable device 106 because the user 102 is unable to authenticate to the programmable device 106. This protected functionality may include any functionality provided by the programmable device 106 of any subset thereof. Thus, the protected functionality may include administrative functionality used to configure users of the programmable device 106 and to grant privileges to the users to access other functionality provided by the programmable device 106 (e.g., access to operational information recorded by the programmable device 106, access to configure operational parameters of the programmable device 106, and the like).

To remedy this inability to authenticate to the programmable device 106, the user 102 interacts with the user 104, the programmable device 106, and the communication device 108 to request and receive an authentication credential with sufficient privilege to access the protected functionality within the programmable device 106. The user 104 interacts with the user 102 and a source of verification data (e.g., a record including information regarding users who are authorized request authorization credentials for the programmable device 106) to verify that the user 102 has authority to access the protected functionality. Responsive to verifying the authority of the user 102, the user 104 interacts with the credential interface 118 to generate and provide an authentication credential to the user 102 via the communications device 108.

As illustrated in FIG. 1, the programmable device 106 includes a session interface 114. The session interface 114 is configured to exchange information with the user 102 in support of the processes described below with reference to FIGS. 5, 6, and 8. This information may include requests for authentication sessions, session identifiers, and authentication credentials. In exchanging information with the user 102, the session interface 114 may employ a variety of metaphors and user interface elements. For example, in one embodiment, the session interface 114 provides a screen with elements that, when selected by the user 102, initiate a session request process (such as the session request process 600 described further below) or initiate an authentication request process (such as the authentication request process 800 described further below). In some embodiments, the session interface 114 is accessible only through physical contact with the programmable device 106 to increase the security of the overall credential generation system 100.

As further illustrated in FIG. 1, the computer system 112 includes a credential engine 116 and credential interface 118. The credential interface 118 is configured to exchange information with the user 104 and the credential engine 116 in support of the processes described below with reference to FIGS. 5 and 7. This information may include requests for authentication credentials. To exchange information with the credential engine 116, the credential interface 118 generates and transmits messages to the credential engine 116 that subscribe to a protocol supported by the credential engine 116. To exchange information with the user 104, the credential interface 118 may employ a variety of metaphors and user interface elements. For example, in one embodiment, the credential interface 118 provides a screen with elements that, when selected by the user 104, prompt the user 104 to enter a credential request. The credential request may include a session identifier and return information identifying a destination to which an authentication credential is to be sent. Responsive to receiving a credential request from the user 104, the credential interface 118 transmits a credential request to the credential engine 116.

The communication device 108 depicted in FIG. 1 is configured to exchange information with the credential engine 116. This information may include an authentication credential generated by the credential engine 116. In at least one embodiment, the communication device 108 includes a cellular phone that receives the authentication credential via an automated text communication. In another embodiment, the communication device 108 includes a mobile computing device that executes a specialized client application. In this embodiment, the client application receives the authentication credential via a data connection provided by the network 110 and displays the authentication credential to the user 102.

Figure 5:
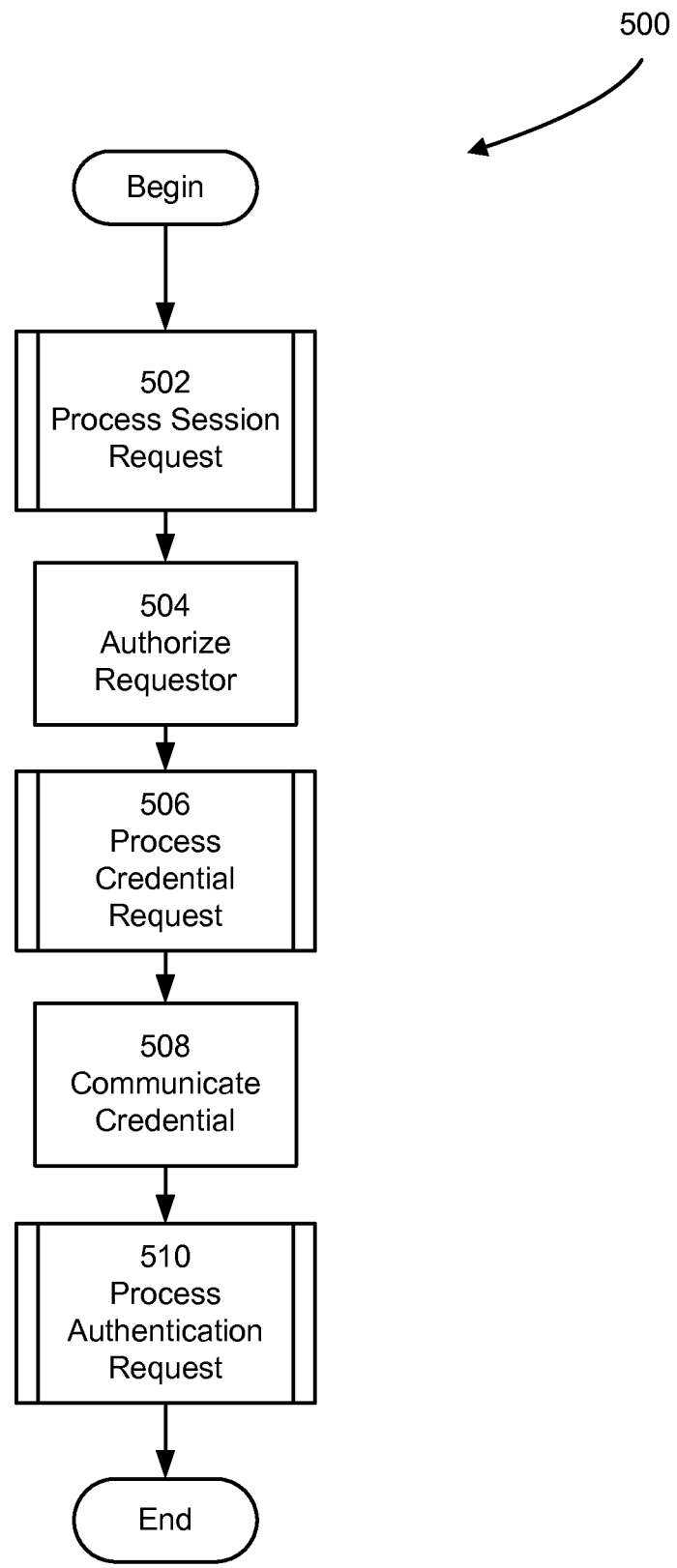
FIG. 5 is a flow diagram of an example credential generation process.
Figure 7:
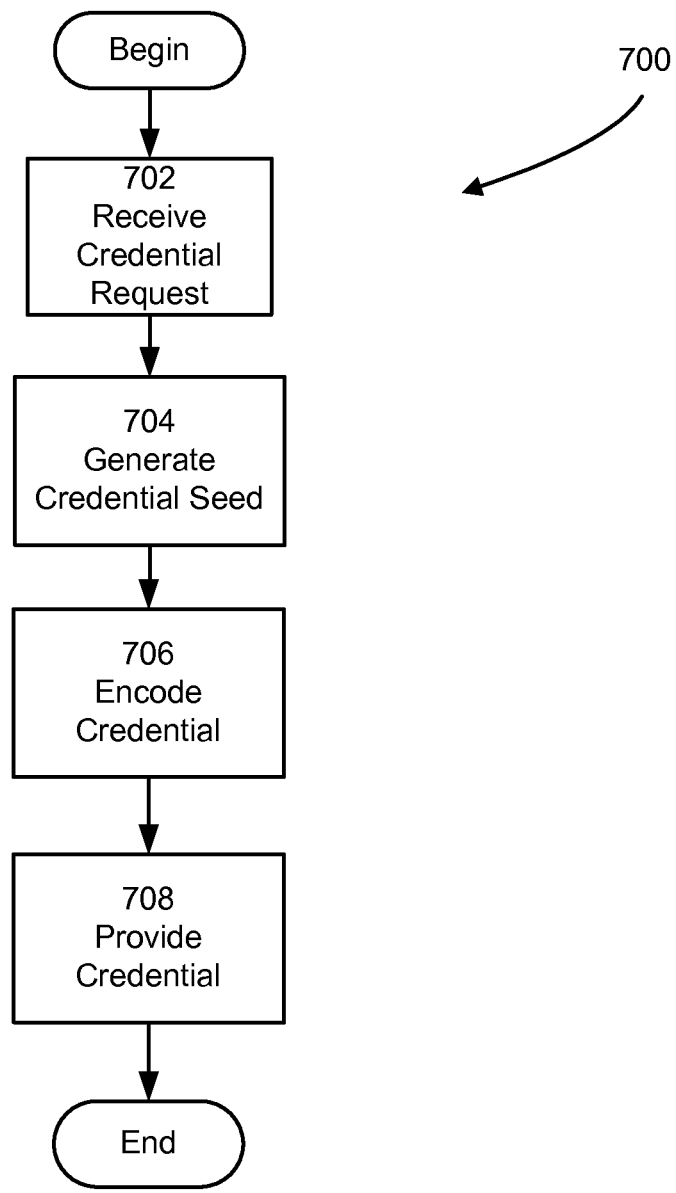
FIG. 7 is a flow diagram of an example credential request process.

As shown in FIG. 1, the credential engine 116 is configured to exchange information with the credential interface 118 and the communication device 108 in support of the processes described below with reference to FIGS. 5 and 7. This information may include credential requests and authentication credentials generated in response to the credential requests. To enable interoperation with the credential interface 118, the credential engine 116 implements a protocol through which the credential engine 116 receives credential requests. Responsive to receiving a credential request, the credential engine 116 processes the credential request and generates an authentication credential according to the credential generation process 700 described further below. To provide generated credentials to the communication device 108, the credential interface 116 generates and transmits messages via the network 110 that subscribe to a protocol supported by the communication device 108.

Figure 2:
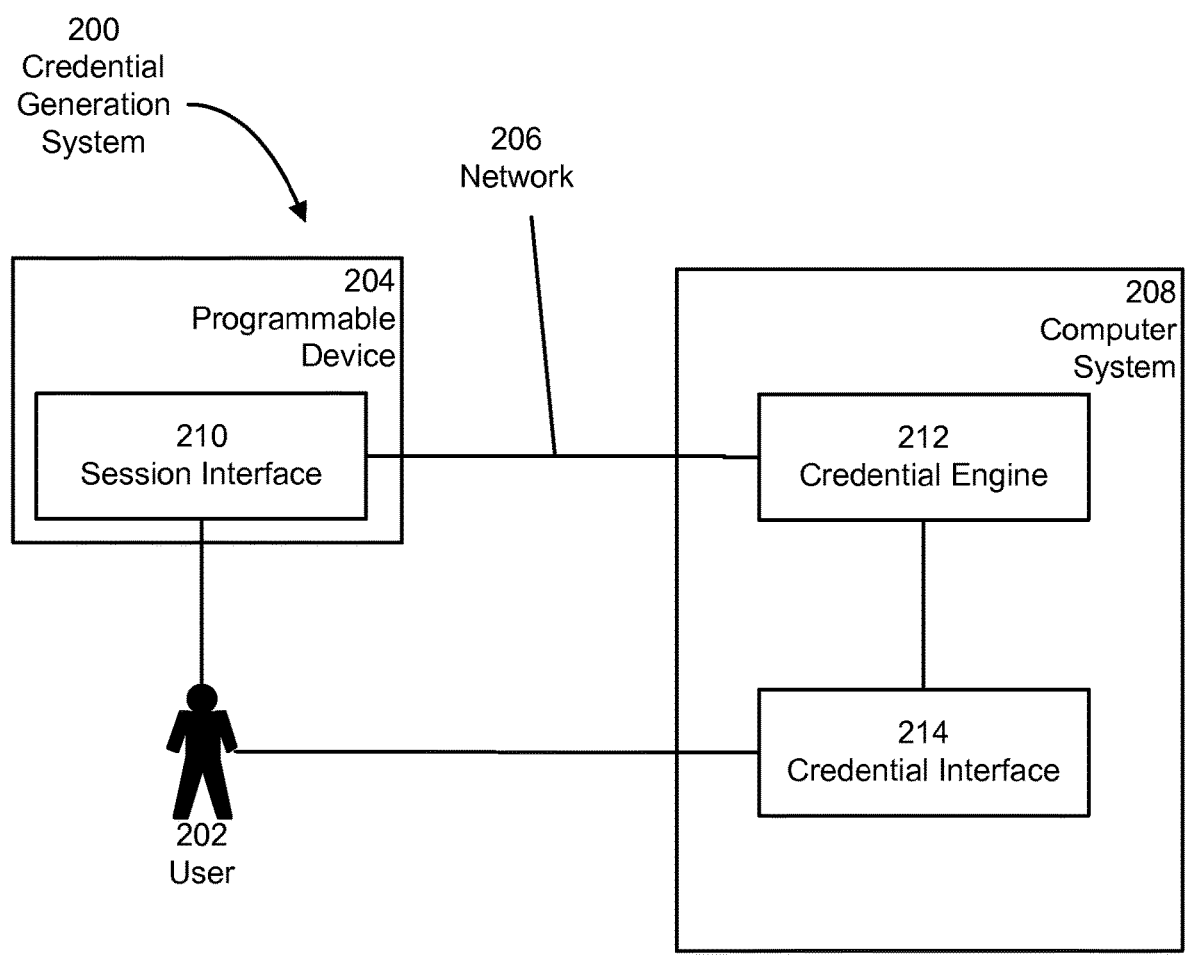
FIG. 2 is a block diagram including another example system for generating authentication credentials.

In some embodiments where a programmable device is capable of interoperating with the computer system that hosts a credential engine, a credential generation system omits the communication device 108. FIG. 2 illustrates some embodiments where the communication device 108 is not included. As shown in FIG. 2, a credential generation system 200 includes a user 202, a programmable device 204, a communications network 206, and a computer system 208. The programmable device 204 may include any device with configurable operations, such as the programmable device described below with reference to FIG. 3. The computer system 206 may include one or more computer systems, such as the computer system described below with reference to FIG. 4.

As depicted in FIG. 2, the computer system 208 and the communication device 204 exchange (i.e. send or receive) information via the network 206. The network 206 may include any communication network through which devices may exchange information. For example, the network 206 may be a public network, such as the internet, and may include other public or private networks such as LANs, WANs, extranets, intranets, and cloud computing systems. The network 206 may also include cellular networks such as CMDA, EvDO, GSM, and iDEN networks.

In at least one example, the user 202 is unable to access protected functionality provided by the programmable device 204 because the user 202 is unable to authenticate to the programmable device 204. This protected functionality may include any functionality provided by the programmable device 204 of any subset thereof. Thus, the protected functionality may include administrative functionality used to configure users of the programmable device 204 and to grant privileges to the users to access other functionality provided by the programmable device 204 (e.g., access to operational information recorded by the programmable device 204, access to configure operational parameters of the programmable device 204, and the like).

To remedy this inability to authenticate to the programmable device 204, the user 202 interacts with the programmable device 204 and the computer system 208 to request and receive an authentication credential with sufficient privilege to access the protected functionality within the programmable device 204. More particularly, the credential interface 214 interacts with the user 202 to verify that the user 202 has authority to access the protected functionality and interacts with the credential engine 212 to generate and provide an authentication credential to the user 202 via the programmable device 204.

As illustrated in FIG. 2, the programmable device 204 includes a session interface 210. The session interface 210 is configured to exchange information with the user 202 and the credential engine 212 in support of the processes described below with reference to FIGS. 5, 6, and 8. This information may include requests for authentication sessions, session identifiers, and authentication credentials. In exchanging information with the user 202, the session interface 210 may employ a variety of metaphors and user interface elements. For example, in one embodiment, the session interface 210 provides a screen with elements that, when selected by the user 202, initiate a session request process (such as the session request process 600 described further below) or initiate an authentication request process (such as the authentication request process 800 described further below). In some embodiments, the elements of the session interface 210 that initiate the session request process and the authentication request process are accessible only through physical contact with the programmable device 204 to increase the security of the overall credential generation system 200. To enable interoperation with the credential engine 212, the session interface 210 implements a protocol through which the session interface 210 receives authentication credentials.

As further illustrated in FIG. 2, the computer system 208 includes a credential engine 212 and credential interface 214. The credential interface 214 is configured to exchange information with the user 202 and the credential engine 212 in support of the processes described below with reference to FIGS. 5 and 7. This information may include credential requests and authorization requests. To exchange information with the credential engine 212, the credential interface 214 generates and transmits messages to the credential engine 212 that subscribe to a protocol supported by the credential engine 212. To exchange information with the user 202, the credential interface 214 may employ a variety of metaphors and user interface elements. For example, in one embodiment, the credential interface 214 provides a screen with elements that, when selected by the user 202, prompt the user 202 to enter a credential request. The credential request may include a session identifier and return information identifying a destination to which an authentication credential is to be sent.

In one embodiment in accord with FIG. 2, the credential interface 214 is further configured to verify that the user 202 has the authority to request an authentication credential for the programmable device 204. In this embodiment, the credential interface 214 requests and verifies authorization credentials prior to transmitting a request for an authentication credential to the credential engine 212. Authorization credentials may include an identifier of the user 202, such as a unique identifier of the user (e.g., employee number), an identifier of an organization with which the user 202 is associated (e.g., an employer number), and the like. In this embodiment, the credential interface 214 records the identifier of the user 202 and verifies that the identifier identifies a user with authority to request authentication credentials for the programmable device 204. This verification process may include a variety of actions, including sending a request for authorization through a pre-defined approval process that involves one or more notifications to other users (e.g., other users associated with the user 202 or the organization). Responsive to verifying that the user 202 has authority to request authentication credentials for the programmable device 204, the credential interface 214 transmits a credential request to the credential engine 212.

As shown in FIG. 2, the credential engine 212 is configured to exchange information with the credential interface 214 and the programmable device 204 in support of the processes described below with reference to FIGS. 5 and 7. This information may include credential requests and authentication credentials generated in response to the credential requests. To enable interoperation with the credential interface 214, the credential engine 212 implements a protocol through which the credential engine 212 receives credential requests. Responsive to receiving a credential request, the credential engine 212 processes the credential request and generates an authentication credential according to the credential generation process 700 described further below. To provide generated credentials to the programmable device 204, the credential interface 212 generates and transmits messages via the network 206 that subscribe to a protocol supported by the session interface 210.

Each of the interfaces disclosed herein, including those presented by the communication device 108, the session interface 114, the session interface 210, the credential engine 116, the credential engine 212, the credential interface 118 and the credential interface 214 may both restrict input to a predetermined set of values and validate any information entered prior to using the information or providing the information to other components. These functions may prevent the introduction of erroneous data into the credential generation systems 100 and 200.

Additionally, in some embodiments, each of the interfaces disclosed herein may be implemented using a variety of technologies and may provide additional or other interface elements to accomplish the functions describe herein. For example, in one embodiment, the credential interfaces 118 and 214 serve browser-based user interfaces that are rendered by a web browser running a computer system accessible by the user 104 or the user 202, while, in another embodiment, the communication device 108 may provide information to the user 102 as part of an IVR application. Thus, particular embodiments are not limited to any one metaphor or configuration of interface elements.

Information within the credential generation systems 100 and 200 may be stored in any logical construction capable of holding information on a computer readable medium including, among other structures, file systems, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

Information may flow between the components illustrated in FIGS. 1 and 2, or any of the elements, components and subsystems disclosed herein, using a variety of techniques. Such techniques include, for example, passing the information over a network using standard protocols, such as TCP/IP or HTTP, passing the information between modules in memory and passing the information by writing to a file, database, data store, or some other non-volatile data storage device. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Embodiments of the credential generation systems 100 and 200 are not limited to the particular configuration illustrated in FIGS. 1 and 2. These configurations are included for the purposes of illustration only. In addition, it is to be appreciated that various examples utilize a variety of hardware components, software components and combinations of hardware and software components that are configured to perform the processes and functions described herein. Thus the scope of the embodiments disclosed herein is not limited to a particular set of hardware, software, or a combination thereof.

Programmable Device

As discussed above with regard to FIGS. 1 and 2, various aspects and functions described herein may be implemented as specialized hardware or software components executing in one or more programmable devices. These programmable devices are configured to independently (i.e., without instructions from a centralized control system) perform one or more specialized automated functions on a periodic basis. Programmable devices have a wide range of potential applications. The characteristics of particular types of programmable devices vary depending on the function that the programmable device is configured to perform. For instance, programmable devices configured for external use may include a rigid and insulated housing, while programmable devices configured to monitor environmental conditions may include one or more sensors configured to measure these environmental conditions. Some specific examples of programmable devices include uninterruptible power supplies, programmable logic controllers, and utility meters, such as a utility meter 300 as illustrated in FIG. 3.

Figure 3:
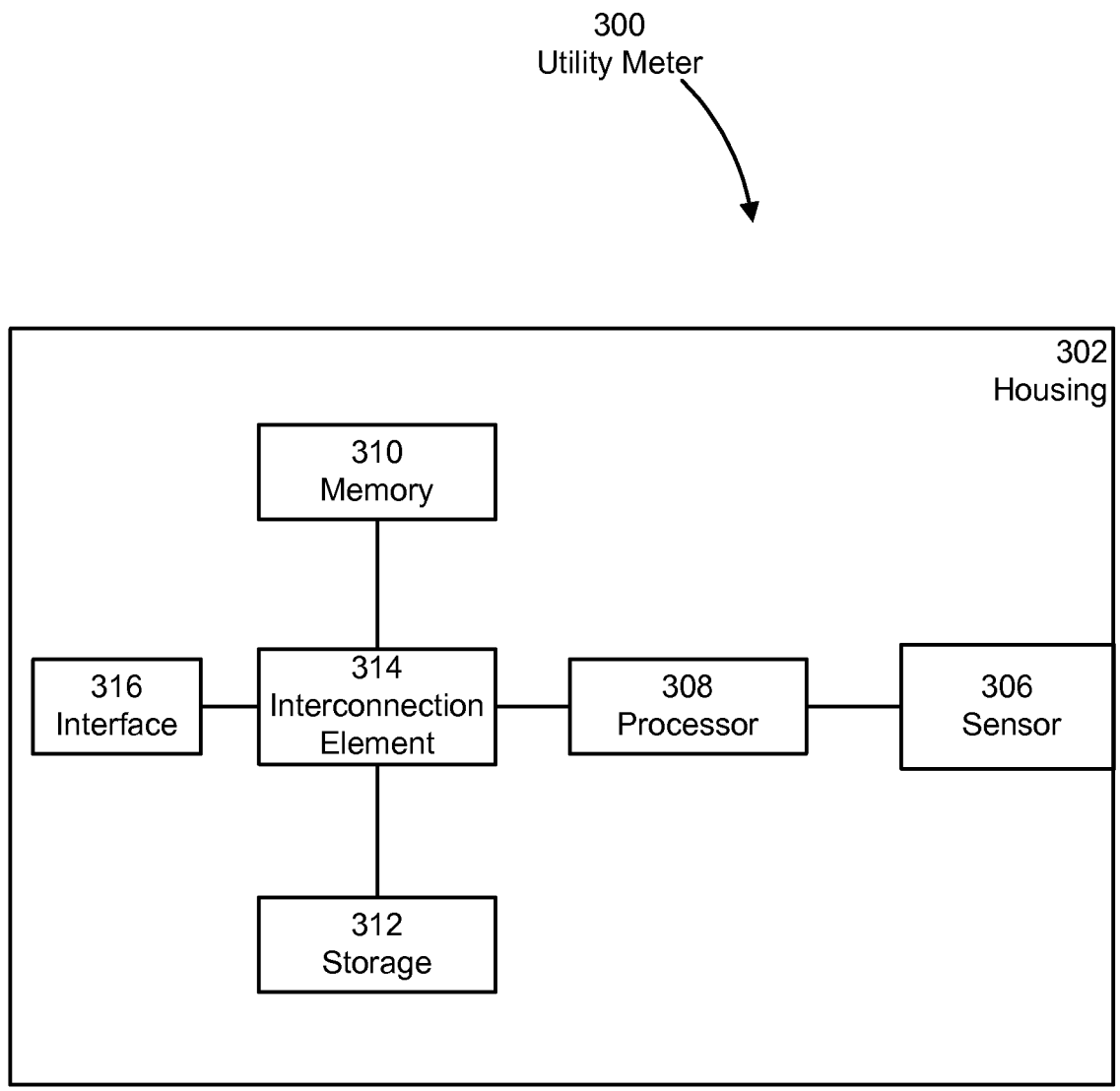
FIG. 3 is a schematic diagram of an example programmable device that executes processes and functions disclosed herein.

As shown in FIG. 3, the utility meter 300 comprises a housing 302 that includes, a sensor 306, a processor 308, a memory 310, a data storage device 312, an interconnection element 314, and an interface 316. To implement at least some of the aspects, functions, and processes disclosed herein, the processor 308 performs a series of instructions that result in manipulated data. The processor 308 may be any type of processor, multiprocessor, or controller.

The memory 310 stores programs and data during operation of the utility meter 300. Thus, the memory 310 include any device for storing data, such as a disk drive or other non-volatile storage device, but typically includes a relatively high performance, volatile, random access memory such as a dynamic random access memory (DRAM) or static memory (SRAM). Various embodiments may organize the memory 310 into particularized and, in some cases, unique structures to perform the functions disclosed herein. These data structures may be sized and organized to store values for particular data and types of data.

As shown in FIG. 3, several of the components of the utility meter 300 are coupled to the interconnection element 314. The interconnection element 314 may include any communication coupling between components of the utility meter, such as one or more physical busses subscribing to one or more specialized or standard computing bus technologies such as IDE, SCSI, and PCI. The interconnection element 314 enables communications, such as data and instructions, to be exchanged between components of the utility meter 300.

The utility meter 300 also includes one or more interface devices 316 such as input devices, output devices and combination input/output devices. Interface devices may receive input or provide output. More particularly, output devices may render information for external presentation. Input devices may accept information from external sources. Examples of interface devices include buttons, keyboards, touch screens, network interface cards, and the like. Interface devices allow the utility meter 300 to exchange information with and to communicate with external entities, such as users and other systems.

The data storage device 312 includes a computer readable and writeable nonvolatile, or non-transitory, data storage medium in which instructions are stored that define a program or other object that is executed by the processor 308. The data storage 312 also may include information that is recorded, on or in, the medium, and that is processed by the processor 308 during execution of the program. More specifically, the information may be stored in one or more data structures specifically configured to conserve storage space or increase data exchange performance. The instructions may be persistently stored as encoded signals, and the instructions may cause the processor 308 to perform any of the functions described herein. The medium may, for example, be optical disk, magnetic disk or flash memory, among others.

As shown in FIG. 3, the sensor 306 is coupled to the processor 308. The sensor 306 includes an analog sensor and analog to digital converter to provide the processor 308 with a digital signal that represents a quantity of flow (e.g. usage) of a utility as detected by the analog sensor. The particular configuration of the sensor 306 varies depending on the utility being measured by the utility meter 300. For example, in an embodiment including a meter that measures electric, the sensor 306 includes inputs for single phase or three phase power and records periodic measurements of one or more identified characteristics (e.g., power, voltage, current, etc.) of the electric via the inputs. Upon receipt of these periodic measurements, the processor 308 stores information descriptive of the measurements and the times that the measurements were taken in the data storage element 312. Further, in some embodiments, the processor 308 subsequently transmits the stored information descriptive of the measurements to an external entity via a network interface included in the interface devices 316.

Some embodiments of the utility meter 300 include operational parameters that may be configured via protected functionality provided by the utility meter 300. These operational parameters may be used to configure CT/PT ratio, system type, demand calculations, I/O setup, onboard data logging, onboard waveform capture, and onboard alarming.

Although the utility meter 300 is shown by way of example as one type of utility meter upon which various aspects and functions may be practiced, aspects and functions are not limited to being implemented on the utility meter 300 as shown in FIG. 3. Various aspects and functions may be practiced on one or more utility meters having a different architectures or components than that shown in FIG. 3. For instance, the utility meter 300 may include specially programmed, special-purpose hardware, such as an application-specific integrated circuit (ASIC) tailored to perform one or more particular operations disclosed herein.

In some examples, the components of the utility meter 300 disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Computer System

As discussed above with regard to FIGS. 1 and 2, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers, and web servers. Other examples of computer systems may include mobile computing devices, such as cellular phones and personal digital assistants, and network equipment, such as load balancers, routers, and switches. Further, aspects may be located on a single computer system or may be distributed among a plurality of computer systems connected to one or more communications networks.

For example, various aspects, functions, and processes may be distributed among one or more computer systems configured to provide a service to one or more client computers, or perform an overall task as part of a distributed system. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Figure 4:
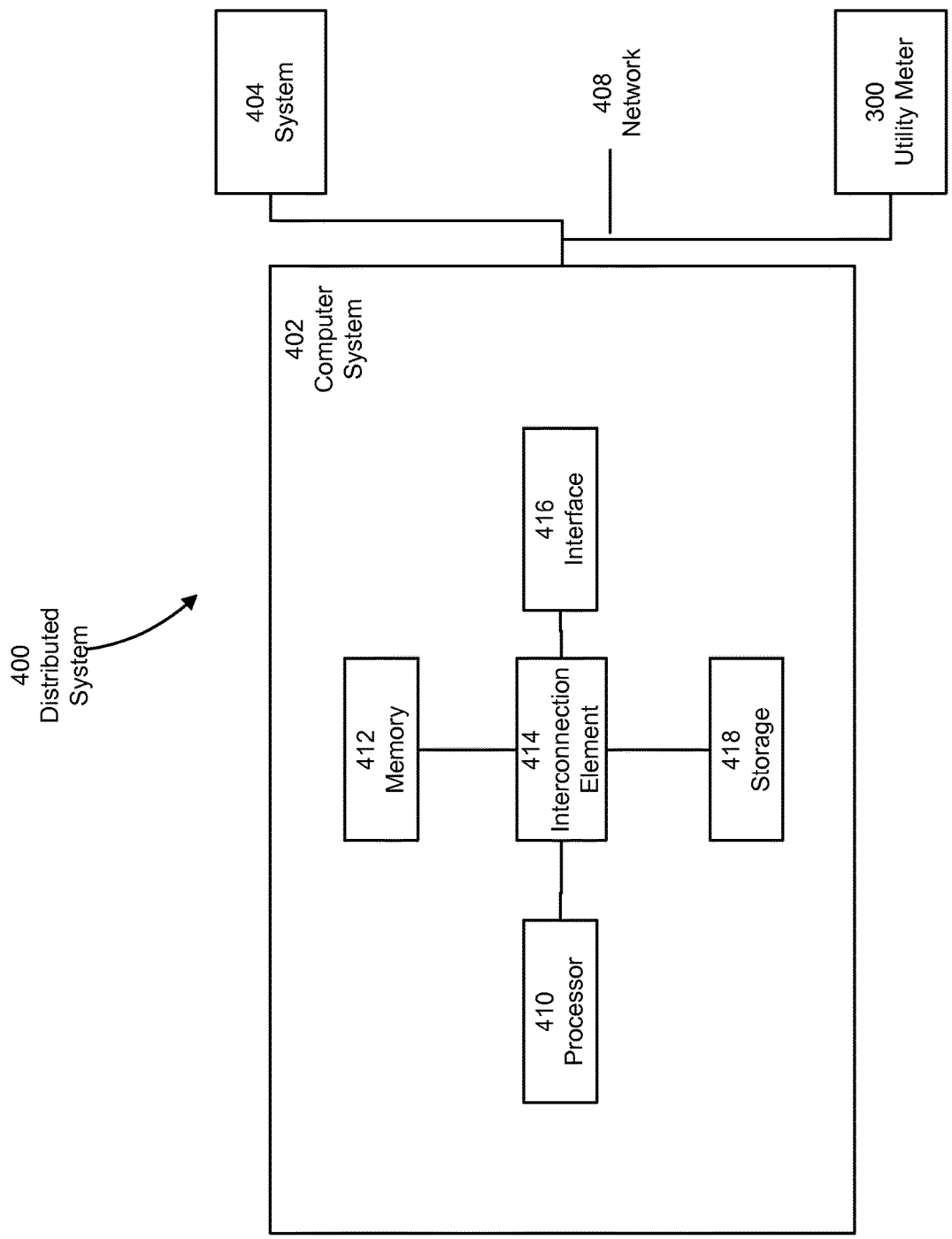
FIG. 4 is a schematic diagram of an example of a computer system that executes processes and functions disclosed herein.

Referring to FIG. 4, there is illustrated a block diagram of a distributed computer system 400, in which various aspects and functions are practiced. As shown, the distributed computer system 400 includes one more computer systems that exchange information. More specifically, the distributed computer system 400 includes computer systems 402 and 404 and utility meter 300. As shown, the computer systems 402 and 404 and utility meter 300 are interconnected by, and may exchange data through, a communication network 408. The network 408 may include any communication network through which computer systems may exchange data. To exchange data using the network 408, the computer systems 402 and 404 and utility meter 300 and the network 408 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 402 and 404 and utility meter 300 may transmit data via the network 408 using a variety of security measures including, for example, TLS, SSL, or VPN. While the distributed computer system 400 illustrates three networked computer systems, the distributed computer system 400 is not so limited and may include any number of computer systems and computing devices, networked using any medium and communication protocol.

As illustrated in FIG. 4, the computer system 402 includes a processor 410, a memory 412, an interconnection element 414, an interface 416 and data storage element 418. To implement at least some of the aspects, functions, and processes disclosed herein, the processor 410 performs a series of instructions that result in manipulated data. The processor 410 may be any type of processor, multiprocessor or controller. Some exemplary processors include commercially available processors such as an Intel Xeon, Itanium, Core, Celeron, or Pentium processor, an AMD Opteron processor, an Apple A4 or A5 processor, a Sun UltraSPARC or IBM Power5+ processor and an IBM mainframe chip. The processor 410 is connected to other system components, including one or more memory devices 412, by the interconnection element 414.

The memory 412 stores programs and data during operation of the computer system 402. Thus, the memory 412 may be a relatively high performance, volatile, random access memory such as a dynamic random access memory ("DRAM") or static memory ("SRAM"). However, the memory 412 may include any device for storing data, such as a disk drive or other nonvolatile storage device. Various examples may organize the memory 412 into particularized and, in some cases, unique structures to perform the functions disclosed herein. These data structures may be sized and organized to store values for particular data and types of data.

Components of the computer system 402 are coupled by an interconnection element such as the interconnection element 414. The interconnection element 414 may include any communication coupling between system components such as one or more physical busses in conformance with specialized or standard computing bus technologies such as IDE, SCSI, PCI and InfiniBand. The interconnection element 414 enables communications, such as data and instructions, to be exchanged between system components of the computer system 402.

The computer system 402 also includes one or more interface devices 416 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 402 to exchange information and to communicate with external entities, such as users and other systems.

The data storage element 418 includes a computer readable and writeable nonvolatile, or non-transitory, data storage medium in which instructions are stored that define a program or other object that is executed by the processor 410. The data storage element 418 also may include information that is recorded, on or in, the medium, and that is processed by the processor 410 during execution of the program. More specifically, the information may be stored in one or more data structures specifically configured to conserve storage space or increase data exchange performance. The instructions may be persistently stored as encoded signals, and the instructions may cause the processor 410 to perform any of the functions described herein. The medium may, for example, be optical disk, magnetic disk or flash memory, among others. In operation, the processor 410 or some other controller causes data to be read from the nonvolatile recording medium into another memory, such as the memory 412, that allows for faster access to the information by the processor 410 than does the storage medium included in the data storage element 418. The memory may be located in the data storage element 418 or in the memory 412, however, the processor 410 manipulates the data within the memory, and then copies the data to the storage medium associated with the data storage element 418 after processing is completed. A variety of components may manage data movement between the storage medium and other memory elements and examples are not limited to particular data management components. Further, examples are not limited to a particular memory system or data storage system.

Although the computer system 402 is shown by way of example as one type of computer system upon which various aspects and functions may be practiced, aspects and functions are not limited to being implemented on the computer system 402 as shown in FIG. 4. Various aspects and functions may be practiced on one or more computers having a different architectures or components than that shown in FIG. 4. For instance, the computer system 402 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 402 may be a computer system including an operating system that manages at least a portion of the hardware elements included in the computer system 402. In some examples, a processor or controller, such as the processor 410, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system or an iOS operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 410 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Credential Generation Processes

As described above with reference to FIGS. 1 and 2, several embodiments perform processes that generate authentication credentials. In some embodiments, these authentication credential generation processes are executed by a credential generation system, such as the credential generation systems 100 and 200 described above with reference to FIGS. 1 and 2. One example of such a credential generation process is illustrated in FIG. 5. According to this example, the credential generation process 500 includes acts of processing an authentication session request, authorizing the requestor, processing an authentication credential request, communicating an authentication credential, and processing an authentication request.

In act 502, a programmable device of the credential generation system, such as the programmable device 106 described above with reference to FIG. 1 or the programmable device 204 described above with reference to FIG. 2, receives and processes an authentication session request from an external entity, such as the user 102 described above with reference to FIG. 1 or the user 202 described above with reference to FIG. 2. Example processes performed within the act 502 are described further below with reference to FIG. 6.

In act 504, the credential generation system verifies that the external entity who initiated the session request is authorized to do so. In examples where the credential generation system executing the credential generation process 500 is in accord with the credential generation system 200 described above with reference to FIG. 2, the credential interface 214 interacts with the user 202 to verify that the user 202 has authority to access the protected functionality of the programmable device 204. In examples where the credential generation system executing the credential generation process 500 is in accord with the credential generation system 100 described above with reference to FIG. 1, the user 104 interacts with a verification source to verify that the user 102 has authority to access the protected functionality of the programmable device 106. Further, in some examples, the credential interface records each request for authorization and credential generation (and information that identifies the requestor) in data storage.

In act 506, a computer system of the credential generation system, such as the computer system 112 described above with reference to FIG. 1 or the computer system 208 described above with reference to FIG. 2, receives and processes an authentication credential request from an external entity. Example processes performed within the act 506 are described further below with reference to FIG. 7.

In act 508, the credential generation system communicates an authentication credential. In embodiments in accord with the credential generation system 200 illustrated in FIG. 2, the credential engine 212 transmits the authentication credential to the session interface 210 via the network 206. In embodiments in accord with the credential generation system 100 illustrated in FIG. 1, the credential engine 116 transmits the authentication credential to the communication device 108.

In act 510, the programmable device of the credential generation system receives and processes an authentication request from the requestor. Example processes performed within the act 510 are described further below with reference to FIG. 8. After completion of the act 510, the credential generation system terminates the credential generation process 500.

Processes in accord with the credential generation process 500 enable a user who is unable to authenticate to a programmable device to do so without compromising the security of the programmable device.

Figure 6:
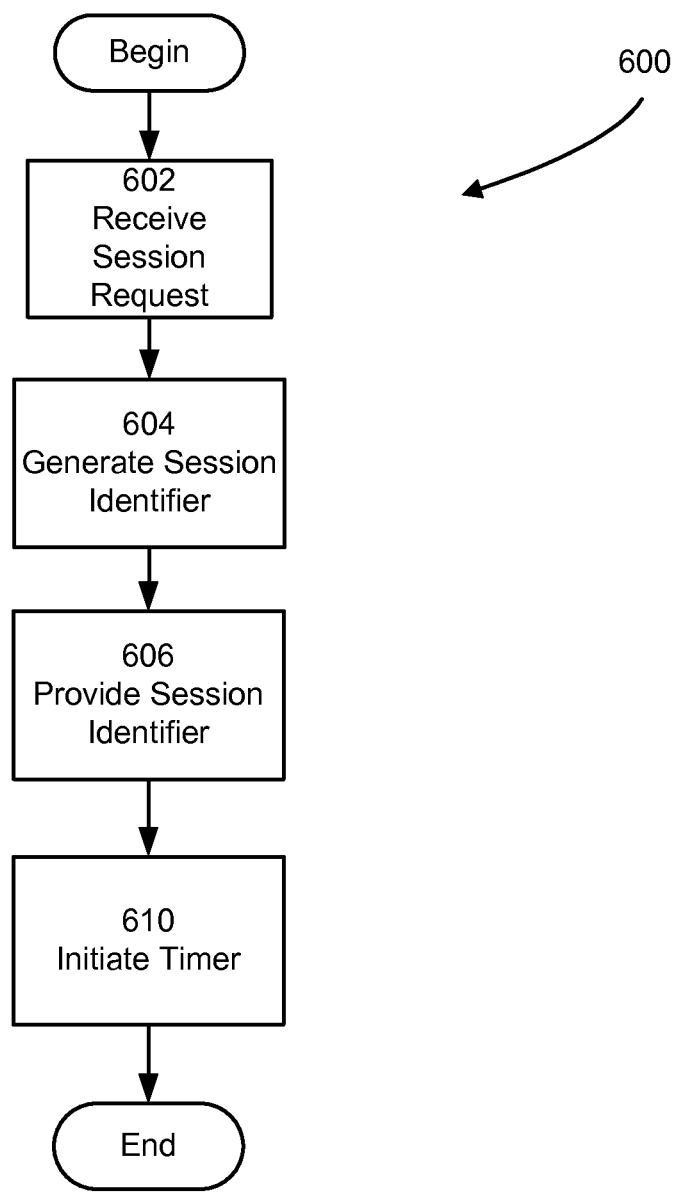
FIG. 6 is a flow diagram of an example session request process.

As described above with reference to the act 502, some embodiments perform processes through which a credential generation system receives and processes an authentication session request from an external entity. One example of such a session request process is illustrated in FIG. 6. According to this example, the session request process 600 includes acts of receiving a session request, generating a session identifier, initiating a timer, and providing the session identifier.

In act 602, a programmable device receives a session request from a user (referred to herein as a "session requestor") via a session interface. In one embodiment, the session request is received where the user selects an actionable element, such as a menu item designated to initiate session requests, presented by the session interface. In response to receiving the session request, the session interface generates a session identifier in act 604. The session identifier may include randomly or pseudo-randomly generated data (e.g., symbols, text, or numbers) that are identifiable by the programmable device. In some embodiments, the session identifier is generated to have a predetermined length. In act 606, the session interface provides the session identifier to the user. In act 608, the session interface starts a timer and terminates the session request process 600. As is described further below, the session interface uses the timer to limit the time period during which the session identifier may be used to authenticate the user (i.e. limit the time period during which the session identifier is active). In some embodiments, this time period is set to a small value (e.g., 5 or 10 minutes).

Processes in accord with the session request process 600 enable a programmable device to establish a time limited authentication session that increases the security of the programmable device.

As described above with reference to the act 506, some embodiments perform processes through which a credential generation system receives and processes an authentication credential request from an external entity. One example of such a credential request process is illustrated in FIG. 7. According to this example, the credential request process 700 includes acts of receiving a credential request, generating a credential seed, encoding the authentication credential, and providing the authentication credential.

In act 702, a computer system receives a credential request from a user via a credential interface. In one embodiment, the credential request is received where the user selects an actionable element, such as a menu item designated to initiate credential requests, presented by the credential interface and enters a session identifier and return information. In response to receiving the credential request, the credential interface transmits the credential request to the credential engine.

In response to receiving the credential request, the credential engine generates a credential seed by combining several elements of information in act 704. In at least one embodiment, the credential engine generates the credential seed by concatenating the session identifier and the return information to form a string. In another embodiment, the credential engine generates the credential seed by concatenating the session identifier, the return information, and additional characters to form a string having a predetermined length. In another embodiment, the credential engine generates the credential seed by concatenating the session identifier, data associated with the return information (e.g. an identifier of the return information, a compressed version of the return information, or the like), and additional characters to form a string having a predetermined length. In another embodiment, the credential engine generates the credential seed by concatenating the session identifier, a unique identifier of the session requestor (e.g. a 10 digit number that is associated with personally identifiable information, such as the return information), and additional characters to form a string having a predetermined length. Other processes may be used to generate the credential seed and the embodiments disclosed herein are not limited to a particular credential seed generation process.

In act 706, the credential engine encodes the credential seed to create an authentication credential. In various embodiments, the credential engine encodes the credential seed by encrypting the credential seed using any of a variety of encryption processes. In some embodiments, the credential engine encrypts the credential seed using a private key of an asymmetric encryption process, such as Diffie-Hellman, DSS, ElGamal, Paillier, RSA, Cramer-Shoip, and YAK. In other embodiments, the credential engine encrypts the credential seed using a key of a symmetric encryption process, such as Twofish, Serpent, AES (Rijndael), Blowfish, CASTS, RC4, 3DES, and IDEA. Other encryption or encoding processes may be used to encode the credential seed and the embodiments disclosed herein are not limited to a particular encryption process.

In some embodiments, the authentication credential is generated to have a predetermined length. In these embodiments, the credential generation system may configure the predetermined length of session identifiers and the number of additional characters added to credential seeds (and thereby the predetermined length of credential seeds) to generate authentication credentials having a targeted predetermined length. In at least one embodiment, the predetermined length of session identifiers and credential seeds is configured so that the predetermined length of the authentication credentials is less than or equal to 48 characters.

After creating the authentication credential, the credential engine provides the authentication credential to the destination specified in the return information in act 708. In embodiments in accord with the credential generation system 100 illustrated in FIG. 1, the credential interface transmits the authentication credential to a destination accessible via the communication device 108. In embodiments in accord with the credential generation system 200 illustrated in FIG. 2, the credential interface transmits the authentication credential to a destination accessible via the programmable device 204. In other embodiments, other destinations may be specified in the return information and the embodiments disclosed herein are not limited to a particular destination or type of destination. After providing the authentication credential in act 708, the credential interface terminates the credential request process 700.

Processes in accord with the credential request process 700 enable a computer system to create a secure authentication credential that includes personally identifiable information that tracks the identity of a user requesting authentication credentials.

Figure 8:
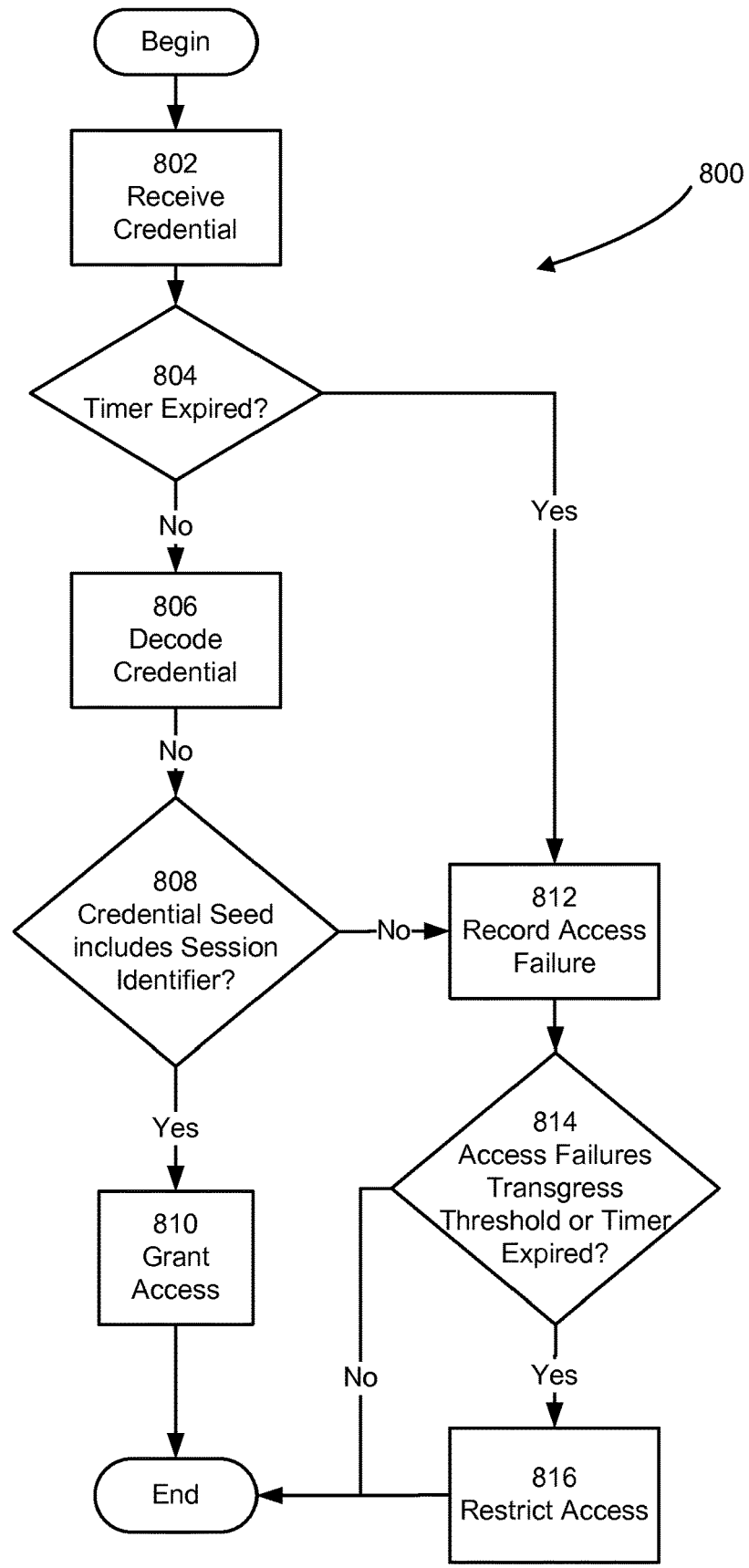
FIG. 8 is a flow diagram of an example authentication request process.

As described above with reference to the act 510, some embodiments perform processes through which a credential generation system receives and processes an authentication request from an external entity. One example of such an authentication request process is illustrated in FIG. 8. According to this example, the credential request process 800 includes a variety of acts that are described further below.

In act 802, a programmable device receives an authentication request via a session interface. In embodiments in accord with the credential generation system 100 illustrated in FIG. 1, the authentication request is received where a user selects an actionable element, such as a menu item designated to initiate authentication requests, presented by the session interface and enters an authentication credential. In embodiments in accord with the credential generation system 200 illustrated in FIG. 2, the authentication request is received from the credential engine via the network 206. In other embodiments, the authentication request is received where a user selects the actionable element presented by the session interface. In these embodiments, entry of the authentication credential is delayed until act 806. In response to receiving the authentication request, the session interface executes the act 804.

In the act 804, the session interface determines whether the timer indicates that a predetermined time period has transpired since the timer was started in act 610. If so, the session interface executes act 812. Otherwise, the session identified by the previously generated session identifier is still active and the session interface executes act 806.

In the act 806, the session interface receives (in embodiments where entry of the authentication credential is delayed until the act 806) and decodes the authentication credential using a process corresponding to the encoding process executed in act 706. In act 808, the session interface determines whether the credential seed includes the active session identifier. If so, in act 810 the session interface records a successful access event and the unique identifier of the session requestor (or the compressed/uncompressed return information stored in the credential seed) within the security log of the programmable device, grants the user access to the protected functionality of the programmable device and terminates the authentication request process 800. Otherwise, the session interface executes act 812.

In the act 812, the session interface denies access the user access to the protected functionality of the programmable device, records an access failure event within a security audit log. The access failure event may include a timestamp indicating the date and time of the access failure. In act 814, the session interface determines whether the predetermined time period has expired or a total number of recorded access failures is greater than a threshold value (e.g., 2, 3, 4, or more). If so, in act 816 the session interface terminates the authentication session (e.g., resets the value of the active session identifier) so that a new authentication credential must be generated to access the programmable device using the systems and processes disclosed herein. Also in the act 816 the session interface limits further processing of session requests until a predetermined event occurs. These limits may include a complete bar on processing session requests. Examples of predetermined events that terminate these limits on processing of session requests include expiration of a predetermined period of time (e.g., 10 minutes). If the session interface determines that the timer did not expire and the total number of recorded access failures is not greater than the threshold value, the session interface terminates the authentication request process 800.

Processes in accord with the authentication request process 800 enable a programmable device to provide access to protected functionality in a secure manner.

Processes 500-800 each depict one particular sequence of acts in a particular embodiment. The acts included in these processes may be performed by, or using, one or more computer systems or programmable devices specially configured as discussed herein. Some acts are optional and, as such, may be omitted in accord with one or more embodiments. Additionally, the order of acts can be altered, or other acts can be added, without departing from the scope of the embodiments described herein. Furthermore, as described above, in at least one embodiment, the acts are performed on particular, specially configured machines, namely a credential generation system configured according to the examples and embodiments disclosed herein.

Example Usage Scenario

According to an example usage scenario, a customer, such as the user 102 described above with reference to FIG. 1, is unable to authenticate to a programmable device, such as the programmable device 106 described above with reference to FIG. 1. In this example, the customer has previously established a registered and validated account with a support center. The account is associated with one or more personalized security questions and a limited number of predetermined destinations (e.g., email addresses or phone numbers).

According to this example, the customer moves to a location proximal to the programmable device and calls the support center. The customer interacts with support center personnel, such as the user 104 described above with reference to FIG. 1, to verify that the customer is authorized to receive an authentication credential. The support center personnel record the credential request in their logs via a credential interface, such as the credential interface 118 described above with reference to FIG. 1.

Next, in this example, the customer selects a "Get Recovery Code" menu item from a session interface, such as the session interface 114 described above with reference to FIG. 1. In response, the session interface generates a pseudo-random session identifier having a predetermined length, provides the session identifier to the customer, and starts a timer. The customer provides the session identifier to the support center personnel and designates one of the predetermined destinations as the destination to which the authentication credential should be sent.

Continuing this example, the support center personnel enter the session identifier and information identifying the designated destination into the credential interface. The credential interface transmits a credential request including the session identifier and the information identifying the designated destination to a credential engine, such as the credential engine 116 described above with reference to FIG. 1. In response to receiving the credential request, the credential engine generates a credential seed using the session identifier, a unique 10 digit personal identifier of the customer, and additional characters that extend the length of the credential seed to a predetermined value. The credential engine next encodes the credential seed into an authentication credential having a predetermined length by encrypting the credential seed and sends the authentication credential to the designated destination.

In this example, the designated destination receives the authentication credential, thereby making the authentication credential available to the customer. The customer next selects an "Enter Recovery Password" menu item from the session interface. In response, the session interface checks to see if the timer has expired. If so, the session interface terminates the authentication session and does not present (or inactivates) interface elements configured to receive the authentication credential. The session interface next records the attempted authentication as a failed access event in a security audit log of the programmable device. Further, if the number of contiguous failed access events exceeds a predetermined threshold value, the session interface locks the "Get Recovery Code" menu item for a predetermined duration. To gain access to the protected functionality of the programmable device, the customer must request a new session identifier when the "Get Recovery Code" is available and the remainder of the credential generation process must be repeated.

If the timer has not expired, the session interface prompts the user to enter the authentication credential. In response to receiving the authentication credential, the session interface decrypts the authentication credential and determines whether the credential seed stored in the authentication credential contains the session identifier. If so, the session interface authenticates the customer to the programmable device with privileges to execute protected functionality (e.g., administrative level privileges). The session interface also records a successful access event and the unique identifier associated with the customer in the security log of the programmable device. The customer now executes the protected functionality of the programmable device (e.g., re-configures the programmable device and its internally maintained authentication credentials).

If the credential seed does not contain the session identifier, the authentication credential is not valid and the session interface records the attempted authentication as a failed access event in a security audit log of the programmable device. Further, if the number of contiguous failed access events exceeds a predetermined threshold value, the session interface locks the "Get Recovery Code" menu item for a predetermined duration. To gain access to the programmable device, the customer must request a new session identifier when the "Get Recovery Code" is available and the remainder of the credential generation process must be repeated.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A non-transitory computer-readable medium storing thereon sequences of computer-executable instructions for generating authentication credentials using a programmable device and a computer system, the sequences of computer-executable instructions including instructions that instruct at least one processor to:
   receive a session request from a requestor of an authentication credential;
   generate an identifier of an authentication session in response to receiving the session request;
   display the identifier of the authentication session to provide the identifier of the authentication session to the requestor;
   initiate a timer in response to providing the identification of the authentication session to the requestor;
   receive the authentication credential at a programmable device;
   decode, by the programmable device, the authentication credential to access a session identifier and information associated with the requestor;
   determine whether the session identifier matches the identifier of the authentication session;
   grant the requestor access to protected functionality of the programmable device if the session identifier matches the identifier of the authentication session;
   deny access to the programmable device responsive to determining at least one of the authentication credential not being provided within a first threshold amount of time from generating the credential request or the authentication credential not being properly generated using the identifier; and
   restrict access to the programmable device responsive to determining at least one of the authentication credential not being provided within a second threshold amount of time from generating the credential request or a number of access denials exceeding a threshold amount of access denials.

2. The non-transitory computer-readable medium according to claim 1, wherein the instructions further instruct the at least one processor to generate the authentication credential based on a combination of the identifier of the authentication session, a unique identifier of a requestor, and additional characters.

3. The non-transitory computer-readable medium according to claim 2, wherein the instructions further instruct the at least one processor to generate the authentication credential by encrypting the combination.

4. The non-transitory computer-readable medium according to claim 3, wherein the instructions further instruct the at least one processor to generate the authentication credential by configuring a length of the combination to generate an authentication credential having a length not to exceed 48 characters.

5. A system comprising:
a programmable device comprising:
a memory storing an identifier of an authentication session;
a session interface including a display screen; and
at least one processor coupled to the memory and configured to:
receive a session request from a requestor of an authentication credential;
generate the identifier of the authentication session in response to receiving the session request;
display the identifier of the authentication session on the display screen to provide the identifier of the authentication session to the requestor;
initiate a timer in response to providing the identification of the authentication session to the requestor;
receive the authentication credential;
decode the authentication credential to access a session identifier and information associated with the requestor;
determine whether the session identifier matches the identifier of the authentication session;
grant the requestor access to protected functionality of the programmable device if the session identifier matches the identifier of the authentication session;
deny access to the programmable device responsive to determining at least one of the authentication credential not being provided within a first threshold amount of time from generating the identifier or the authentication credential not being properly generated using the identifier; and
restrict access to the programmable device responsive to determining at least one of the authentication credential not being received within a second threshold amount of time from generating the identifier or a number of access denials exceeding a threshold amount of access denials.

6. The system according to claim 5, wherein the at least one processor is configured to determine that the session identifier matches the identifier of the authentication session if the session identifier equals the identifier of the authentication session.

7. The system according to claim 5, wherein the at least one processor is configured to decode the authentication credential by decrypting the authentication credential using a public key.

8. The system according to claim 5, wherein the at least one processor is further configured to:
determine whether a predetermined period of time has expired since the timer was initiated; and
terminate the authentication session if the predetermined period of time has expired.

9. The system according to claim 8, wherein the at least one processor is further configured to limit subsequent generation of identifiers of authentication sessions if the predetermined period of time has expired.

10. The system according to claim 5, wherein the at least one processor is further configured to deny the requestor access to the protected functionality of the programmable device if the session identifier does not match the identifier of the authentication session.

11. The system according to claim 10, wherein the at least one processor is further configured to:
record an access failure event if the session identifier does not match the identifier of the authentication session;
calculate whether a total number of access failure events exceeds a predetermined threshold; and
terminate the authentication session if the total number of access failure events exceeds the predetermined threshold.

12. The system according to claim 10, wherein the at least one processor is further configured to limit subsequent generation of identifiers of authentication sessions if the total number of access failure events exceeds the predetermined threshold.

13. The system according to claim 5, further comprising a computer system configured to:
receive a credential request including the identifier of the authentication session and information identifying a destination;
generate an authentication credential in response to receiving the credential request; and
provide the authentication credential to the destination.

14. The system according to claim 13, wherein the computer system is configured to generate the authentication credential based on a combination of the identifier of the authentication session, a unique identifier of the requestor, and additional characters.

15. The system according to claim 14, wherein the computer system is configured to generate the authentication credential by encrypting the combination.

16. The system according to claim 15, wherein the computer system is configured to generate the authentication credential by configuring a length of the combination to generate an authentication credential having a length not to exceed 48 characters.

17. The system according to claim 16, wherein the programmable device further comprises a utility meter including a sensor configured to measure utility usage and the protected functionality includes functionality to configure operational parameters of the utility meter.

18. A method of generating authentication credentials using a programmable device and a computer system, the method comprising:
receiving a session request from a requestor of an authentication credential;
generating an identifier of an authentication session in response to receiving the session request;
displaying the identifier of the authentication session to provide the identifier of the authentication session to the requestor;
initiating a timer in response to providing the identification of the authentication session to the requestor;
receiving the authentication credential at a programmable device;
decoding, by the programmable device, the authentication credential to access a session identifier and information associated with the requestor;
determining whether the session identifier matches the identifier of the authentication session;

granting the requestor access to protected functionality of the programmable device if the session identifier matches the identifier of the authentication session;

denying access to the programmable device responsive to determining at least one of the authentication credential not being provided within a first threshold amount of time from generating the identifier or the authentication credential not being properly generated using the identifier; and restricting access to the programmable device responsive to determining at least one of the authentication credential not being received within a second threshold amount of time from generating the identifier or a number of access denials exceeding a threshold amount of access denials.

19. The method according to claim 18, further comprising:

receiving a credential request including the identifier of the authentication session and information identifying a destination;

generating the authentication credential in response to receiving the credential request; and providing the authentication credential to the destination.

\* \* \* \* \*